Aug. 27, 1935.  R. POWIS  2,012,550
VISCOSIMETER
Filed Dec. 11, 1933  2 Sheets-Sheet 1
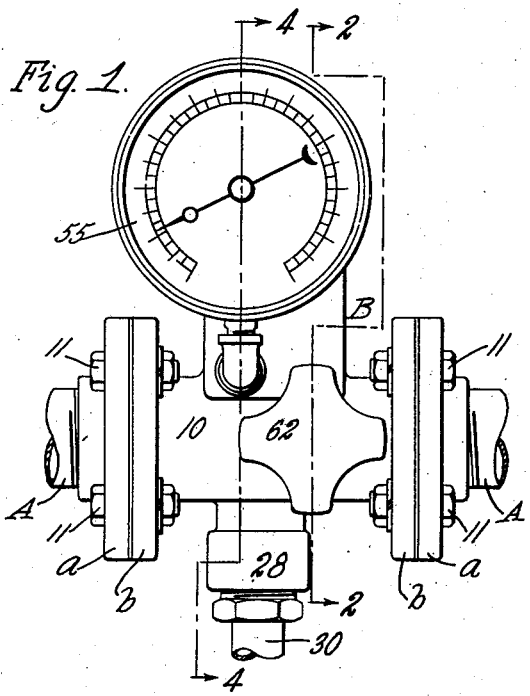
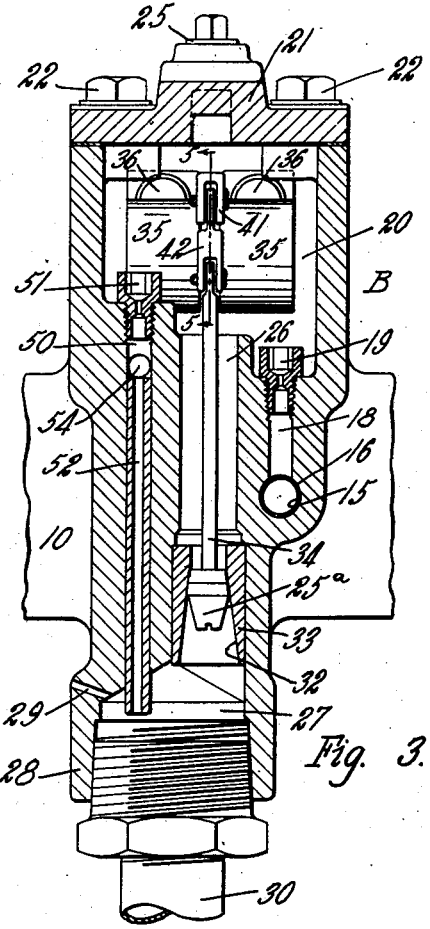
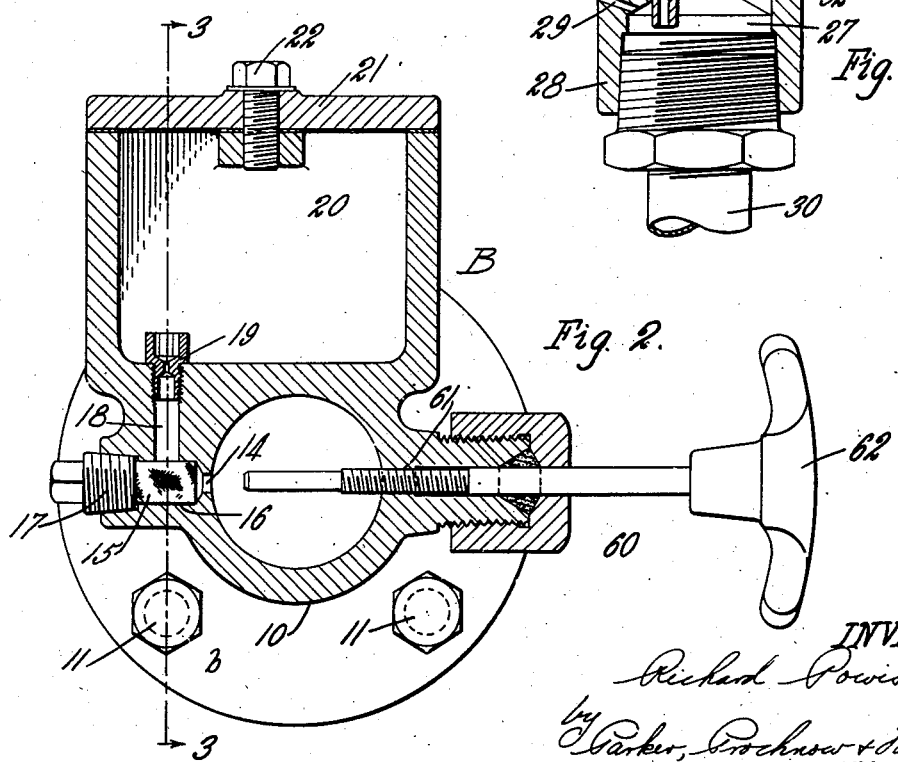
INVENTOR
Richard Powis
by Parker, Prochnow & Farmer
ATTORNEYS

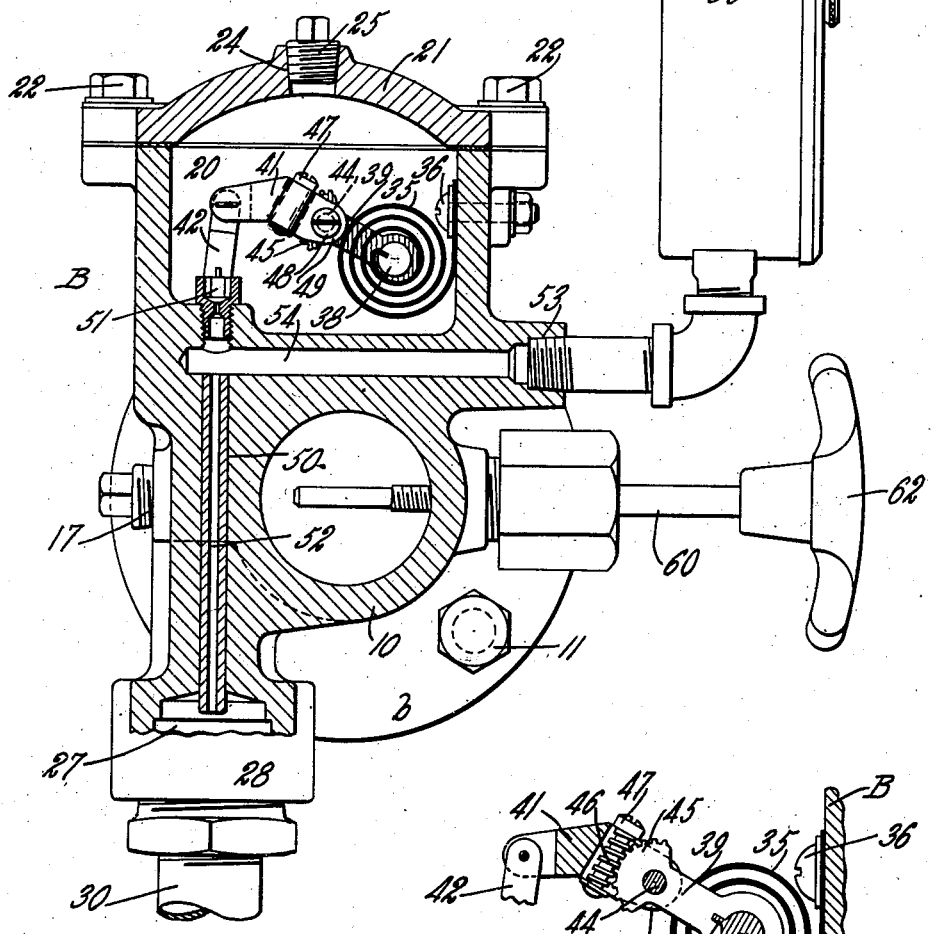

Patented Aug. 27, 1935

2,012,550

UNITED STATES PATENT OFFICE 2,012,550

VISCOSIMETER

Richard Powis, Buffalo, N. Y., assignor to Sterling Engine Company, Buffalo, N. Y.

Application December 11, 1933, Serial No. 701,767

19 Claims. (Cl. 265—11)

This invention relates to apparatus for the measuring and indication of viscosity or rate of flow of liquids.

The objects of this invention are to provide an apparatus of this kind by means of which viscosity or fluidity of the liquid can be accurately indicated; also to provide an apparatus of this kind in which errors in viscosity readings resulting from temperature variations of liquids can be eliminated; also to provide an apparatus of this kind which is usable in connection with liquids differing widely in viscosity; also to provide an apparatus of this kind of improved construction which can be easily manufactured and the parts of which are readily accessible for adjustment, inspection and repairs; also to improve the construction of apparatus of this kind in other respects hereinafter specified.

In the accompanying drawings:

Fig. 1 is a side view of a viscosity device embodying this invention.

Fig. 2 is a transverse sectional elevation of the housing of the apparatus on line 2—2, Fig. 1.

Fig. 3 is a section thereof, on line 3—3, Fig. 2.

Fig. 4 is a sectional view thereof, on line 4—4, Fig. 1.

Fig. 5 is a fragmentary sectional view thereof, on line 5—5, Fig. 3.

The apparatus embodying the invention is illustrated in Fig. 1 for application directly to a conduit or pipe A carrying the liquid whose viscosity or rate of flow is to be determined. The pipe or conduit A, for example, may be a part of an oil conduit carrying fuel oil to a burner, or it may carry any other liquid for any purpose.

In the preferred embodiment of my invention, I have provided a single housing, such for example as a casting, which forms a part of the conduit and in which the viscosity measuring means are arranged. It will be understood, however, that it is not intended to limit the invention to use in connection with a housing of this kind, since obviously the liquid conducting means may be formed separately from the viscosity determining means.

The frame or housing of the instrument as shown in the drawings includes a tubular or cylindrical conduit portion 10 forming a part of a housing B of the instrument, and at opposite ends of the tubular part 10 flanges b may be provided which are adapted to cooperate with flanges a secured to the tube or conduit A, bolts 11 serving to connect these flanges so that the tubular portion 10 of the housing forms substantially a part of the conduit A.

The tubular or cylindrical portion of the housing B is provided in a side thereof with an aperture 14 through which liquid may be withdrawn from the stream of liquid flowing through the conduit 10. If desired, a filter 15 may be provided through which liquid passing through the aperture 14 flows, the filter being arranged in a larger aperture or cavity 16 in the housing and held in place by means of a screw plug 17. The liquid after passing through the filter 15 enters an upright tubular passage 18 which is provided with a graduated aperture for controlling the amount of liquid which is withdrawn from the body of liquid in the tubular part 10 of the instrument. Preferably, the aperture is formed in a metering plug 19 suitably secured to the housing in the aperture 18 so as to be readily removable and replaceable by another plug. It will be understood that the metering aperture can be formed in the housing B itself, but preferably it is formed in a removable plug so that this plug can be replaced by another plug in case an aperture becomes enlarged due to wearing away of the metal surrounding the aperture. Furthermore, when used on different liquids it may be desirable to provide apertures of different sizes.

The aperture in the plug 19 discharges liquid into a constant pressure chamber 20 formed in a part of the housing or casing B, although, if desired, the constant pressure chamber and other parts of the instrument may be located in another housing separate from the tubular member 10. The constant pressure chamber is provided at the upper portion thereof with a removable cover or head 21 secured in place by means of bolts 22 and the middle portion of the cover member is preferably provided with a threaded aperture 24 closed by means of a screw plug 25, this threaded aperture being usable for connecting a pressure gauge to the housing to determine the pressure in the interior of the chamber 20, and furthermore, screw drivers or other implements may be inserted through this aperture for purposes hereinafter described.

In order to measure the viscosity of the liquid in the conduit A, the liquid in the constant pressure chamber should be maintained at a pressure as near uniform as possible, and materially below the pressure of the liquid in the conduit A. Any suitable means may be provided for maintaining this reduced or differentiated pressure constant. In the construction shown, a relief or unloading valve 25ª is employed which operates in conjunction with the metering plug 19 to produce in the chamber 20 a constant pressure materially lower than that in the conduit 10. This relief valve is arranged in a passage or channel 26 formed in the housing B and extending downwardly from the lower part of the constant pressure chamber 20 to an atmospheric chamber or space 27, which in the construction shown, is formed in a downwardly extending part 28 of the housing of the instrument. This extension 28 may be provided with a vent opening 29 to insure that atmospheric pressure will prevail in the chamber 27. The extension 28 of the housing may be connected by any suitable coupling to a discharge pipe 30 by means of which liquid discharged into the atmospheric chamber 27 may be conducted to a sump or container, not shown.

The discharge passage 26 in the housing is provided with a tapering seat 32 for the valve 25ª and preferably the seat has a very gradual taper so that considerable movement of the valve 25 is required to produce a material change in the opening of this valve. The valve seat is preferably formed in a cylindrical or tubular part 33 secured in the housing of the instrument in the channel or passage 26. The valve, in the construction shown, is connected to the lower end of a stem 34 which extends upwardly through the passage 26 into the constant pressure chamber 20.

In viscosity measuring instruments as heretofore made, the relief or unloader valve was yieldingly urged toward its closing position by means of a spring. I have found, however, that a spring or similar yielding means alone does not assure a constant pressure within the chamber 20, since the temperature of the liquid in the chamber has a material effect upon such pressure. If, for example, the liquid is at a low temperature, it becomes correspondingly more viscous and slower flowing and consequently the same opening of the valve 25ª will not result in a discharge of the same quantity of liquid as would happen, if the liquid were of a higher temperature and more freely flowing, and failure to discharge liquid at the required rate results in the building up of a higher pressure within the chamber 20. Such variations in pressure would result in incorrect indications of viscosity by the instrument.

I have consequently provided means for compensating for differences in temperature of the liquid whose viscosity is to be measured, for example, by providing for an increased discharge opening or openings, by thermostatic means. Such thermostatic means may act independently of or in conjunction with the usual valve spring. In the particular construction illustrated, I have shown the spring and thermostatic means combined into one of the form of a pair of bi-metallic coils 35, one end of each of which is secured to the housing B, for example, by means of a clamping bolt 36. These coils 35, which may be spiral in form, may be made of a flat ribbon of laminated metals having different co-efficients of expansion. The inner end of each coil may be suitably connected with the valve stem 34 and the thermostatic coils are so arranged that as the temperature of the liquid becomes lowered, less upward force is exerted on the valve, so that the valve opening is increased by the pressure of liquid in the constant pressure chamber as the temperature of this liquid decreases. Consequently, by the correct design and adjustment of these coils, the pressure within the chamber 20 may be kept constant, in spite of variations in temperature of the liquid.

In the particular mechanism illustrated in the accompanying drawings, the inner ends of the two spiral thermostatic springs 35 are rigidly secured to a rod or shaft 38 and between the coils, an arm 39 is rigidly secured to the rod or shaft, for example, by means of a key 40, Fig. 5. This arm is adjustably connected to an extension 41 thereof which in turn connects with one end of a link 42, the other end of which connects with the valve stem 34.

The adjustable connection between the arm 39 and its extension 41 is made for the purpose of adjusting the force exerted by the spring on the valve stem. Any suitable connection may be employed, and in the construction shown, the arm 39 and its extension 41 are connected by means of a clamping bolt 44, which, when released, acts as a pivotal connection between the arm 39 and extension 41. The arm 39 is provided with a toothed segment 45 which may be formed integrally therewith or secured thereto. The toothed segment 45 engages with a worm or screw 46, journalled in the extension 41 of the arm and having a slotted head 47 by means of which the worm or screw can easily be turned by means of a screw driver. It will be obvious that by turning the worm or screw 46, the extension 41 is swung about its pivotal connection 44 with the arm 39, and consequently, the arm 39 and extension 41 may be adjusted relatively to each other to control the amount of force exerted by the springs 35 on the valve stem 33. If the arm and its extension have been set into the desired relation to each other, these two parts may be locked against relative movement by turning a slotted end 48 of the clamping bolt, one end of which is screw threaded and engages with a corresponding thread in one part of the bifurcated end 49 of the extension 41, so that the two parts of the bifurcated portion may be clamped against the opposite sides of the arm 39.

Because of the relatively high pressure of the liquid in the tube or conduit 10, liquid will enter the constant pressure chamber 20 in the form of a jet through the orifice in the metering plug 19, which jet will impinge against the lid or cover 21 and will be splashed toward the coils 35 so that these coils will always be subjected to the temperature of liquid entering the constant temperature chamber. Any other means may be provided for producing suitable circulation of liquid in the constant pressure chamber so as to subject the coils 35 to the temperature of liquid, the viscosity of which is to be measured.

The measurement of viscosity of the liquid may be effected in any suitable or desired manner. In the construction shown for this purpose, the lower portion or base of the constant pressure chamber 20 is provided with a downwardly extending passage 50, the upper end of which terminates in the constant pressure chamber and the lower end of which terminates in the atmospheric pressure space 27. The upper part of this passage 50 may be provided with another metering plug 51 removably secured in the upper end of the passage and having an aperture of the desired size. The passage 50 also preferably contains a capillary channel or resistance tube 52 of definite internal diameter and length, the upper end of which may be arranged adjacent the metering plug and the lower end of which terminates in the atmospheric pressure space. Between the upper end of the capillary channel or tube 52 and the metering plug 51, the passage 50 is intercepted by a laterally extending passage or duct 54, one end of which communicates with the duct 50, and the other end of which extends to the exterior of the housing and is provided with a threaded end portion 53 with which a pressure gauge 55 may be connected. This gauge may be of the Bourdon type, or, if desired, any other type of pressure indicator may be employed. It will be understood that the pressures indicated on the gauge 55 will be those resulting from the difference in the rate of flow of liquid through the small orifice in the plug 51 and through the resistance tube or channel 52. The gauge may be calibrated so as to read directly in Saybolt seconds or any other measurement of viscosity or rate of flow. If the viscosity of a slow flowing liquid is to be measured, such liquid in its slow passage through the capillary or resistance tube, under constant pressure causes a relatively high static pressure within the lateral tube 54 and consequently, a high reading on the pressure gauge 55, while a less viscous liquid flowing more rapidly under the same pressure results in a correspondingly lower reading.

Preferably, the device is also provided with means for interrupting the flow of liquid from the duct 10 to the instrument when readings are not taken, and any suitable means may be for this purpose, those shown including a valve stem or rod 60 extending into the housing B from a point opposite the aperture 14 therein, the stem 60 having a threaded engagement at 61 with the housing and having a handle or wheel 62 at the outer end thereof. By turning the handle 62, the inner end of the rod 60 closes the aperture 14 and thus interrupts the flow of liquid to the measuring device.

The device described has the advantage that it can be located in such close proximity to the pipe line A that there is substantially no difference in temperature of the fluid in the tube 10 and that passing through the apertured plug 51 and resistance tube 52. Consequently, the reading on the pressure gauge will not contain any error, due to such temperature change. The instrument described also has the advantage of being more accurate than other instruments heretofore made, in that differences in temperature of the liquid do not affect the pressure in the constant pressures chamber 20, so that any error due to this cause is eliminated in my improved instrument. The instrument is also so constructed that all parts of it are readily accessible for inspections, adjustments or repairs.

In order to adjust the instrument for the desired pressure in the constant pressure chamber, it is only necessary to remove the plug 25 and attach a pressure gauge thereto. In order to obtain the correct pressure, a screw driver can be inserted through the threaded aperture 24 to turn the worm 46 and the clamping screw 48. The instrument is also readily adaptable for measuring viscosities of liquids differing greatly in thin rates of flow by replacing the plugs 19 and 51 by plugs having orifices of different sizes and by replacing the resistance tube by a tube of different resistance to flow. The instrument is so constructed that all parts thereof are readily accessible for adjustment, replacement, or repairs.

The instrument described makes it possible at all times to determine the rate of flow of liquid in the pipe A, regardless of changes in pressure and temperature of the liquid, and the device is particularly well adapted for installation on ships or on other movable members, as well as on fixed or nonmovable installations, since the accurate operation of the device is not affected by rolling or pitching of a ship or other movable support.

I claim as my invention:

1. In an instrument for measuring viscosity, a constant pressure chamber having an inlet for admitting liquid thereto from a supply of said liquid at a higher pressure, a relief valve for discharging excess liquid from said chamber to maintain the liquid in said chamber at a substantially constant pressure, temperature responsive means for urging said relief valve into its closing position, said means being in direct contact with the liquid in said constant pressure chamber to cause said means to exert less force on said valve when the liquid is at a lower temperature than when it is at a higher temperature, to modify the operation of said relief valve to vary the discharge of liquid from said constant pressure chamber to compensate for temperature changes of said liquid, and viscosity measuring means to which liquid is discharged from said chamber.

2. In an instrument for measuring viscosity, a constant pressure chamber having an inlet for admitting liquid thereto from a supply of said liquid at a higher pressure, a relief valve for discharging excess liquid from said chamber to maintain the liquid in said chamber at a substantially constant pressure, and a bi-metallic thermostatic spring arranged in said chamber and subjected to the temperature of the liquid and exerting a yielding force on said relief valve to urge the same into closing position, said force being varied in accordance with the temperature of the liquid.

3. In an instrument for measuring viscosity, a constant pressure chamber having an inlet for admitting liquid thereto from a supply of said liquid at a higher pressure, a relief valve for discharging excess liquid from said chamber to maintain the liquid in said chamber at a substantially constant pressure, a bi-metalic thermostatic spring arranged in said chamber and subjected to the temperature of the liquid and exerting a yielding force on said relief valve to urge the same into closing position, said force being varied in accordance with the temperature of the liquid, and an adjustable connection between said spring and said valve for varying the force exerted by said spring on said valve.

4. In an instrument for measuring viscosity, a constant pressure chamber having an inlet for admitting liquid thereto from a supply of said liquid at a higher pressure, a relief valve for discharging excess liquid from said chamber to maintain the liquid in said chamber at a substantially constant pressure, a bi-metallic thermostatic spiral spring arranged within said chamber and having one end thereof secured to a fixed part of said instrument, a rod to which the other end of said spring is secured, and an adjustable connection between said rod and said valve, said spring exerting a yielding force on said valve which differs in accordance with differences in temperature of the liquid in said chamber.

5. In an instrument for measuring viscosity, a constant pressure chamber having an inlet for admitting liquid thereto from a supply of said liquid at a higher pressure, a relief valve for discharging excess liquid from said chamber to maintain the liquid in said chamber at a substantially constant pressure, a spring arranged within said chamber and having one end thereof secured to a fixed part of said instrument, a rod to which the other end of said spring is secured, an arm extending outwardly from said rod and provided at its outer end with a gear segment, a second arm pivotally connected with said first arm, a worm journalled in said second arm and meshing with said gear segment for adjusting said arms relatively to each oher, and a connection between said second arm and said valve for transmitting a yielding force to said valve in a direction tending to move the same into closing position.

6. In an instrument for measuring the viscosity of a liquid, the combination of a housing having a substantially unobstructed conduit formed therein through which the liquid, the viscosity of a part of which is to be measured, flows, a constant pressure chamber also formed in said housing, a passage in said housing connecting said conduit and said constant pressure chamber for conducting a small portion of liquid from said conduit to said constant pressure chamber, relief means for discharging excess liquid from said constant pressure chamber to maintain a constant pressure in said chamber lower than the pressure in said conduit, and viscosity measuring means carried by said housing and through which liquid from said constant pressure chamber is discharged.

7. In an instrument for measuring viscosity of a liquid flowing in a conduit, the combination of a housing having a substantially unobstructed passage forming a portion of said conduit, a constant pressure chamber arranged in said housing, a second passage leading from said first passage to said constant pressure chamber and through which a small portion of liquid from said first passage may flow, a relief valve through which liquid may be discharged from said constant pressure chamber, means arranged within said constant pressure chamber for controlling the action of said relief valve, a graduated passage in said housing through which liquid is discharged from said constant pressure chamber, and a pressure gauge carried by said housing and indicating pressure within said graduated passage.

8. In an instrument for measuring the viscosity of a liquid, the combination of a housing having a substantially unobstructed conduit formed therein through which the liquid, the viscosity of a part of which is to be measured, flows, a constant pressure chamber also formed in said housing, a passage in said housing connecting said conduit and said constant pressure chamber for conducting a small portion of liquid from said conduit to said constant pressure chamber, relief means for discharging liquid from said constant pressure chamber to maintain a constant pressure in said chamber lower than the pressure in said conduit, a passage for conducting liquid out of said constant pressure chamber, and apertured plugs removably secured in said inlet and outlet passages of said constant pressure chamber for controlling the quantity of liquid flowing through said passages.

9. In an instrument for measuring viscosity of a liquid, the combination of a housing having a substantially unobstructed passage through which the liquid, the viscosity of a part of which is to be measured, flows, a constant pressure chamber in said housing, a graduated passage leading from said first mentioned passage to said constant pressure chamber to conduct a small part of the liquid flowing in said first passage to said chamber, means for maintaining the liquid in said chamber at a constant pressure, means for withdrawing liquid from said chamber to determine the viscosity thereof, and a valve for closing said second passage to interrupt the operation of said instrument.

10. In an instrument for measuring viscosity of liquids, the combination of a housing having a substantially unobstructed passage for the main body of the liquid, the viscosity of a part of which is to be measured, a constant pressure chamber in said housing, a passage connecting said first passage with said constant pressure chamber to withdraw from said first passage a small portion of the liquid flowing therethrough, unloading means for discharging liquid from said constant pressure chamber to maintain the pressure therein constant, a discharge passage in said housing through which liquid is discharged, and an atmospheric pressure space formed in said housing and into which said unloading means and said discharge passage discharge liquid.

11. In an instrument for measuring viscosity of a liquid, the combination of a housing having a substantially unobstructed passage through which the liquid, the viscosity of a part of which is to be measured, flows, a constant pressure chamber in said housing, a graduated passage leading from said first mentioned passage to said constant pressure chamber to conduct a small part of the liquid flowing in said first passage to said chamber, means for maintaining a constant pressure in said chamber and means for withdrawing liquid from said chamber to determine the viscosity thereof.

12. In an instrument for measuring viscosity, a constant pressure chamber having an inlet for admitting liquid thereto from a supply of said liquid at a higher pressure, a relief valve for discharging excess liquid from said chamber to maintain the liquid in said chamber at a substantially constant pressure, and thermostatic means in actual contact with the liquid within the constant pressure chamber for modifying the operation of said relief valve to vary the discharge of liquid from said chamber to compensate for temperature changes of said liquid.

13. In an instrument for measuring viscosity, a constant pressure chamber having an inlet for admitting liquid thereto from a supply of said liquid at a higher pressure, a passage from said chamber for liquid, the viscosity of which is to be measured, a second passage through which liquid may be discharged from said chamber, means responsive to pressure in said constant pressure chamber for controlling flow through said second passage to maintain the liquid in said chamber at a substantially constant pressure, and thermostatic means in actual contact with the liquid in the constant pressure chamber for varying the extent to which said second passage is opened for the discharge of liquid to compensate for temperature changes of said liquid.

14. In an instrument for measuring viscosity, a constant pressure chamber having an inlet for admitting liquid thereto from a supply of said liquid at a higher pressure, a relief valve for discharging excess liquid from said chamber to maintain the liquid in said chamber at a substantially constant pressure, yielding means for urging said valve into its closing position, and thermostatic means acting in conjunction with said yielding means to decrease the extent to which said yielding means urge said valve into closing position when the temperature of the liquid is reduced, said thermostatic means being in actual contact with the liquid within the constant pressure chamber.

15. In an instrument for measuring viscosity, a constant pressure chamber having an inlet for admitting liquid thereto from a supply of said liquid at a higher pressure, a relief valve for discharging excess liquid from said chamber to maintain the liquid in said chamber at a substantially constant pressure, a spring for exerting a yielding force on said relief valve to urge the same into closed position, and thermostatic means in actual contact with the liquid within the constant pressure chamber for decreasing the force exerted by said spring on said valve when the liquid is cold and increasing said force when the liquid is hot.

16. In an instrument for measuring viscosity, a constant pressure chamber receiving a limited quantity of liquid from a supply of liquid at a higher pressure, unloading means for producing the constant pressure in said chamber, including thermostatic means in actual contact with the liquid within said constant pressure chamber and tending to increase the unloading of said chamber when the liquid becomes colder, and viscosity measuring means to which liquid is discharged from said chamber.

17. In an instrument for measuring viscosity, a constant pressure chamber having an inlet for admitting liquid thereto from a supply of said liquid at a higher pressure, a relief valve for discharging excess liquid from said chamber to maintain the liquid in said chamber at a substantially constant pressure, and a bi-metallic thermostatic spring in actual contact with the liquid within the constant pressure chamber and acting on said relief valve to exert a yielding force on said valve to move the same into closing position, which force is increased as the temperature of the liquid increases.

18. In an instrument for measuring the viscosity of a liquid, the combination of a chamber in which a small portion of said liquid is maintained at a controlled pressure, a relief valve acted upon by the pressure within said chamber and yieldingly urged into closing position for maintaining the liquid in said chamber at a substantially constant pressure, and thermostatic means in actual contact with the liquid within the constant pressure chamber and acting on said valve to vary the force exerted thereon in accordance with changes in temperature, so as to allow the valve to open to a greater extent when the liquid is cold than when it is warm.

19. In an instrument for measuring viscosity of a liquid and having a constant pressure chamber into which liquid is admitted from a supply of said liquid at a higher pressure, unloading means for discharging excess liquid from said chamber, and a bi-metallic thermostatic coil spring in actual contact with the liquid within the constant pressure chamber for modifying the operation of said unloading means to compensate for temperature changes of the liquid to produce constant pressure of liquid in said chamber.

RICHARD POWIS.